(12) United States Patent
Broetto

(10) Patent No.: US 6,796,198 B2
(45) Date of Patent: Sep. 28, 2004

(54) DRIVING ASSEMBLY FOR CONTROLLABLY DRIVING A SLIDE

(75) Inventor: Mario Broetto, Cadoneghe (IT)

(73) Assignee: i.m., Parpas S.r.l., Borgoricco (IT)

( * ) Notice: Subject to any disclaimer, the term of this patent is extended or adjusted under 35 U.S.C. 154(b) by 22 days.

(21) Appl. No.: 10/021,908

(22) Filed: Dec. 13, 2001

(65) Prior Publication Data

US 2002/0096951 A1 Jul. 25, 2002

(30) Foreign Application Priority Data

Dec. 15, 2000 (IT) ................................. MI20000700 U

(51) Int. Cl.[7] ........................ F16H 29/02; F16H 27/02
(52) U.S. Cl. ................................. 74/89.17; 74/422
(58) Field of Search ..................... 310/61, 83, 68 B; 74/89.17, 89.18, 421 A, 422

(56) References Cited

U.S. PATENT DOCUMENTS

| | | | | |
|---|---|---|---|---|
| 4,750,970 A | * | 6/1988 | Malosh | 156/580.1 |
| 5,326,197 A | * | 7/1994 | Takei | 408/91 |
| 5,390,557 A | * | 2/1995 | Tsukada | 74/89.17 |
| 5,411,334 A | * | 5/1995 | Takei et al. | 384/45 |
| 5,575,565 A | * | 11/1996 | Takei et al. | 384/45 |
| 5,757,094 A | * | 5/1998 | van Duyn | 310/58 |
| 5,786,646 A | * | 7/1998 | Newberg et al. | 310/68 B |
| 5,861,700 A | * | 1/1999 | Kim | 310/261 |
| 5,880,547 A | * | 3/1999 | Shoykhet | 310/91 |
| 5,998,892 A | * | 12/1999 | Smith et al. | 310/68 B |
| 6,087,744 A | * | 7/2000 | Glauning | 310/58 |
| 6,297,571 B1 | * | 10/2001 | Knappenberger | 310/60 R |

\* cited by examiner

*Primary Examiner*—Robert A. Siconolfi
(74) *Attorney, Agent, or Firm*—Kirschstein, et al.

(57) ABSTRACT

A driving assembly for controllably driving a slide with respect to a bed includes a rack and at least a controllable-motor driven pinion engaged with the rack. The pinion forms a single body with the motor shaft, which is rigid with a supporting element defining a circumferential chamber for providing the supporting element body with a U-shape cross-section. The motor includes a rotor having a rotor shaft, the end portions of which are supported by bearings engaged in recesses defined in cover elements which are rigidly coupled to a body of a motor stator.

5 Claims, 3 Drawing Sheets

DRIVING ASSEMBLY FOR CONTROLLABLY DRIVING A SLIDE

BACKGROUND OF THE INVENTION

The present invention relates to a driving assembly for controllably driving a slide. The provision on base frameworks or beds of high precision parallel guides is already known.

Said parallel guides, in particular, are used for supporting thereon slides or uprights in turn supporting, for example, machining devices such as drilling devices, boring or milling assemblies as those conventionally used in the tool machine field.

In large machining shops, the movable slide frequently comprises a portal construction including machining and chip removing assemblies.

The portal construction forming the movable slide can be driven with respect to the workpiece, which is arranged on the machine bed.

For driving a slide of the above-mentioned type, are conventionally used driving motors which are operatively coupled to mechanical motor-reducing units or transmission means.

At the end portion of their kinematic chain, the prior devices comprise a pinion engaging with a rack rigid with the machine bed, thereby, as the pinion or pinions are rotatively driven, the slide is in turn controllably driven.

However, the use of conventional motors and mechanical motor-reducing units for driving a comparatively heavy slide or a portal construction on a bed, does not meet present precision requirements and, because of an elastic nature of the transmission means, does not result in an accurate repeatability of the machining slide displacements.

SUMMARY OF THE INVENTION

Accordingly, the aim of the present invention is to provide a novel driving assembly, designed for overcoming the above mentioned drawbacks affecting the prior art, which allows to controllably drive a slide or a portal construction with respect to a bed, with a very great precision and an accurate repeatability of the slide operating displacements.

According to the invention, the above aim is achieved by a driving assembly for controllably driving a slide with respect to a base including a rack that engages at least a pinion driven by a controllable motor having a motor shaft, a motor rotor and a motor stator, said motor rotor having a rotor shaft. The pinion forms a single body with said shaft of said motor. The shaft of said motor is rigid with a support element delimiting a circumferential chamber, to provide a body of said support element with a U-shape cross-section. The end portions of said rotor shaft of said rotor are supported by bearings engaged in recesses formed in cover elements rigidly coupled to a body of said motor stator.

By a driving assembly as above disclosed, it is possible to provide a monolithic and rigid body, formed by a pinion forming a single body with and integrated in the shaft of the rotor, by said rotor, and this owing to the provision of an intermediate supporting element defining an annular empty chamber, providing a weight reduction and an optimum cooling down of the overall assembly.

By engaging the end portions of the shaft of the rotor in recesses defined in strong cover elements rigid with the body forming the stator of the motor, a greatly rigid and compact body to be coupled to the slide to be driven is thereby obtained.

The electric motor is of a "brushless" type. The stator of said motor comprises a pack of stator laminations, combined with the stator coils and including a high number of poles; the rotor of said motor comprising a steel ring element including a plurality of permanent magnet plates, the assembly providing a loose ring stator and rotor brushless type of motor.

BRIEF DESCRIPTION OF THE DRAWINGS

The subject matter of the invention will be disclosed and illustrated in further details hereinafter, by an embodiment thereof, given only by way of an example, and shown in the accompanying drawings, where.

DESCRIPTION OF THE PREFERRED EMBODIMENT

Figure 1:
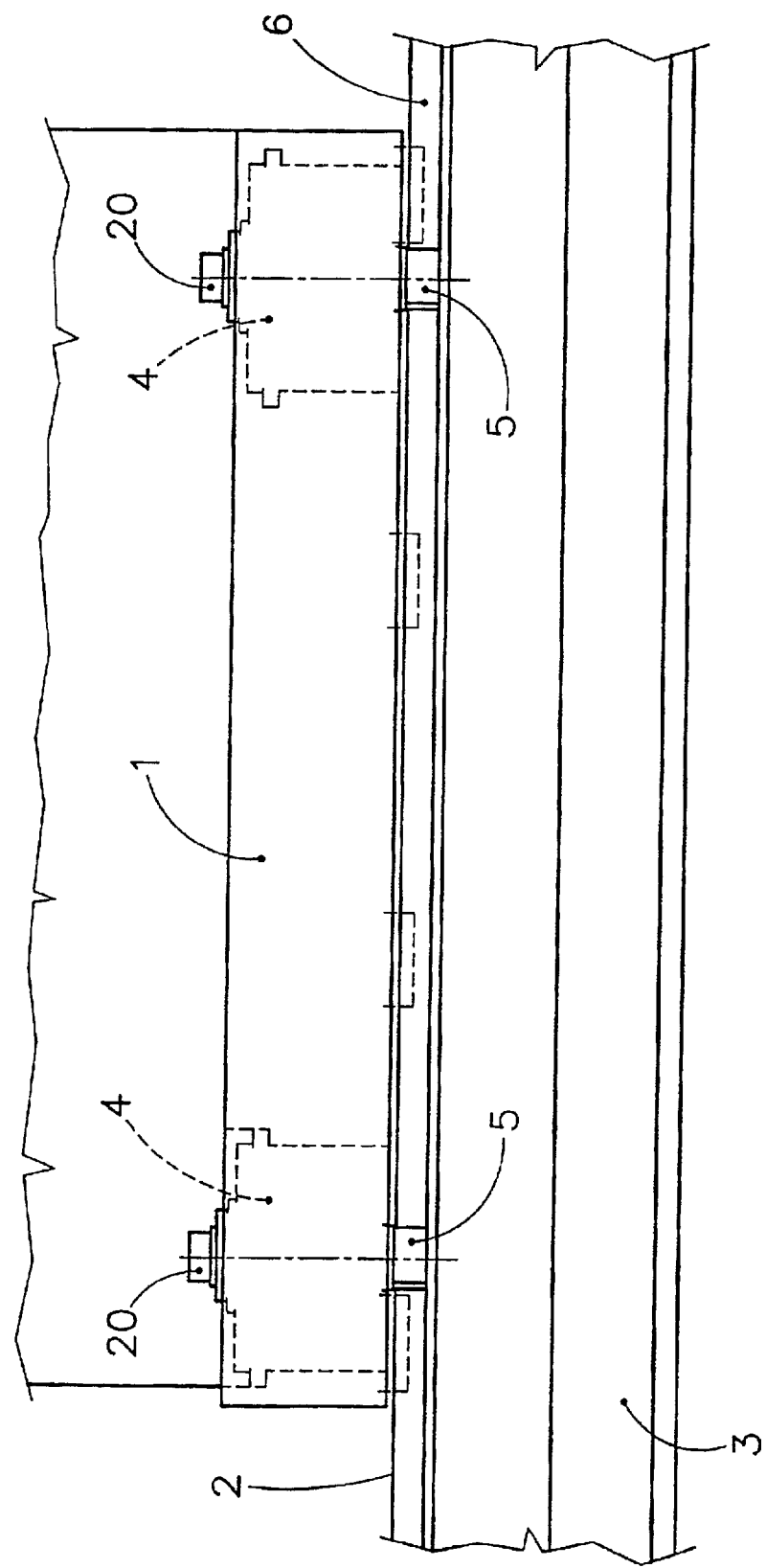
FIG. 1 schematically illustrates a movable slide including devices according to the present invention.

As shown in FIG. 1, a slide 1, schematically illustrated therein and designed for supporting further constructions, which do not pertain to the present invention, is slidably arranged on parallel guides 2 longitudinally extending on a bed 3, for example, of a large size tool machine.

The slide 1 supports one or more driving assemblies 4 which are rigid with the body of the slide 1. Each driving assembly comprises a respective pinion 5.

Each said pinion 5 engages with a rack 6 extending in a longitudinal direction of the bed 3 and being rigid with the latter.

Figure 2:
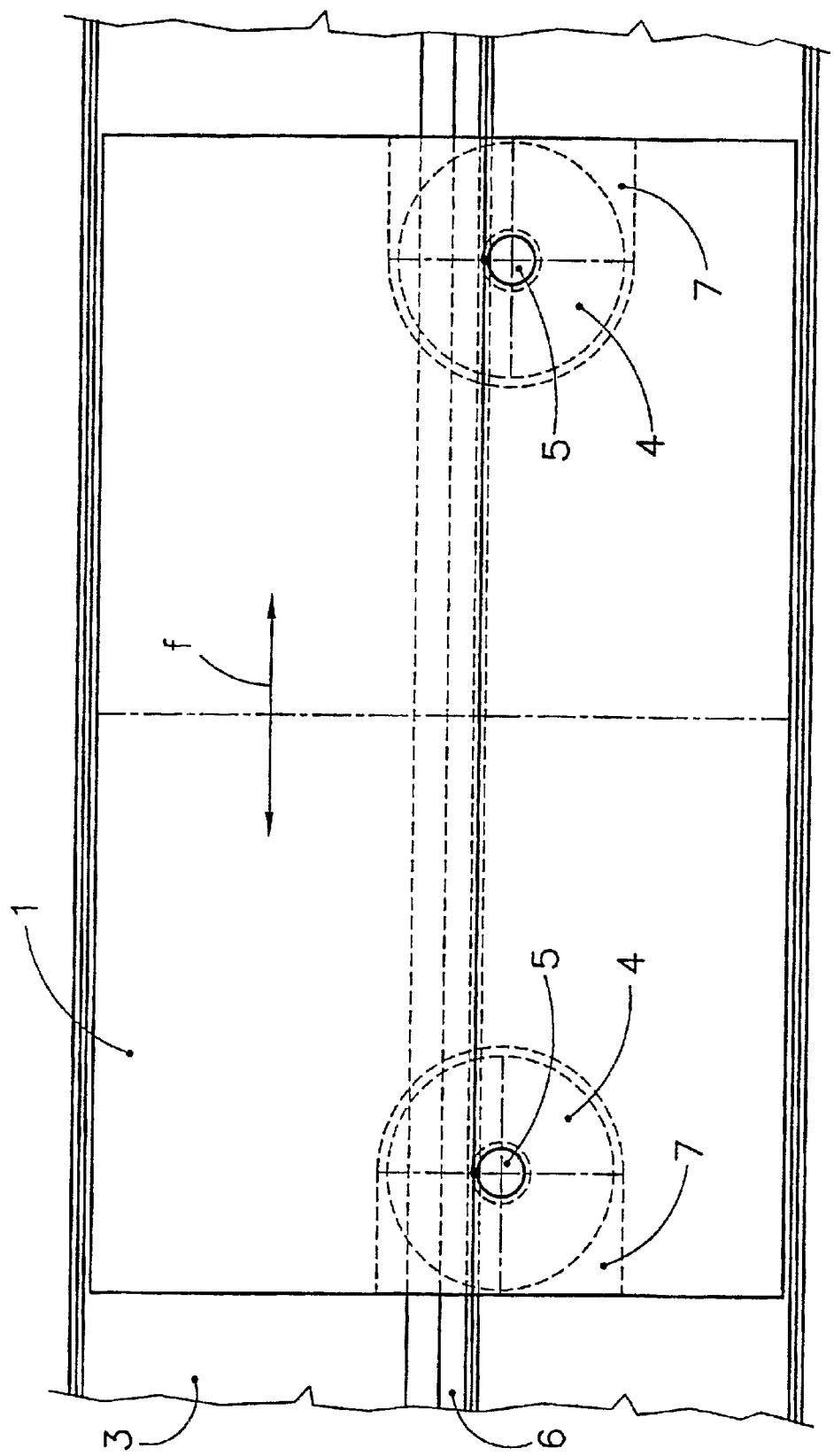
FIG. 2 is a schematic top plan view illustrating the movable slide.

FIG. 2 illustrates said slide 1 by a schematic top plan view.

The slide 1 can be slidably driven along guides, of a per se known type and not shown in FIG. 2, of the bed 3.

At the central portion thereof, the bed 3 supports the rack 6, which longitudinally extends of said bed.

The slide can be slidably driven in the directions schematically indicated by the double-headed arrow f.

As shown in FIG. 2, said slide comprises recesses indicated by 7.

In each recess 7 is housed the driving assembly 4. Each driving assembly 4 comprises the controllably driven pinion 5 engaging with said rack 6.

As shown in FIGS. 1 and 2, two driving assemblies 4 are herein provided but it should be apparent that, for smaller slides 1, it would be sufficient to provide only one driving assembly 4, the number of said driving assemblies 4 depending on the size of the slide 1.

Figure 3:
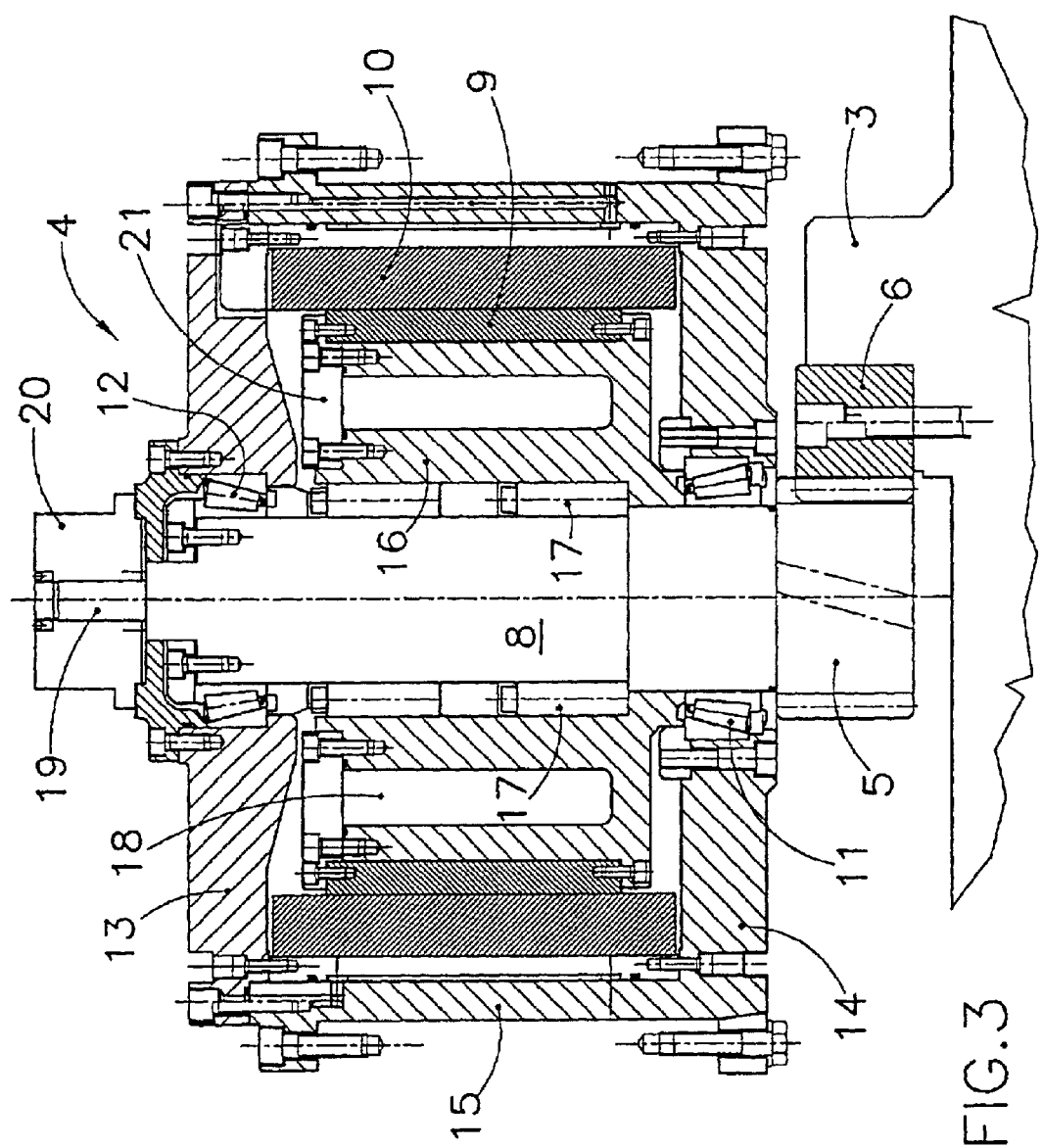
FIG. 3 is a vertical cross-sectional view illustrating a driving assembly.

FIG. 3 shows, by a cross-sectional view taken along a vertical plane, a single driving assembly 4.

In this Fig. it is possible to note a portion of the bed 3, the precision parallel guides being not shown, for clarity reasons.

On said bed 3 is supported the rack 6 longitudinally extending of said bed 3.

With the rack the pinion 5 is engaged, said pinion 5 forming a single body with the shaft 8 of a rotor 9 housed inside a stator 10.

Thus, owing to this construction providing a single monolithic body including the shaft 8 and pinion 5, a very rigid construction is obtained.

The end portion of the shaft 8 near the pinion 5 and the opposite end portion of the shaft 8 are supported through bearings 11 and 12 engaged in strong cover elements 13 and 14 which are rigid with an outer casing 15 in which said stator 10 is arranged.

As shown, the rotor 9 is rigid with a support body 16 extending radially from the rotor 9 towards the shaft 8. By using keying means providing a torsional rigidity, the support body 16 of the rotor 9 is thereby rigidly keyed to the shaft 8.

The support body 16 defines an annular chamber 18, which circumferentially extends with respect to the support body 16.

Thus, by providing the mentioned circumferential chamber 18, the weight of the support body 16 is greatly reduced and, owing to the U-shape of the cross-section of said support body 16, in addition to greatly reducing the weight of said support body, the operating surfaces for cooling the assembly are greatly enlarged.

The chamber 18 can be closed by a closing flange 21, also operating as a second ring for anchoring the rotor.

At the end portion of the shaft 8 opposite to the pinion 5, a small stem 19 rigid with the rotary portion of a transducer 20 is set.

The outputs of said transducer 20 are coupled to digital controlling means and, accordingly, it would be possible to detect, at any desired time, the precise operating speed of the slide 1 driving assembly, with respect to the machine bed 3.

Advantageously, the motor rotor and stator are designed based on the masses to be driven by the motor.

A synchronous motor having a high torque and a closed multi-pole ring would be very advantageous for such a use.

A main feature of the invention is that the pinion 5 effectively forms a single body with the shaft 8 of the rotor 9. As stated, the end portions of the rotor shaft 8 are supported and housed in strong cover elements.

By rigidly coupling the shaft 8 (owing to a very stable and light intermediate support body 16) to the rotor 9, a very rigid and precise driving means is obtained, thereby greatly increasing the driving precision of the movable slide 1, for example, a slide of a tool machine.

Since the rotor 9 has a comparatively great radius, the torque transmitted to the shaft 8 will be very great.

By making the shaft 8 and pinion 5 as a single body, not only a highly rigid and very precise mechanical element is provided, but it is also possible to obviate possible specifically designed machining operations which would be necessary for forming, for example, one or more slots inside a pinion coupling hole and slots at the end portions of the shaft 8 for allowing the pinion 5 and shaft 8 to be coupled, for example, by one or more keying means.

Owing to a direct transmission of the motion and torque supplied by the motor to the end actuator, including the pinion, without the provision of intermediate mechanisms, and by using coaxial and rigid couplings, high accurate movements will be provided.

It will be understood that each of the elements described above, or two or more together, also may find a useful application in other types of constructions differing from the types described above.

While the invention has been illustrated and described as embodied in a driving assembly for controllably driving a slide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An assembly for controllably driving a slide for precise movement lengthwise along a guide mounted on a bed of a machine tool having a rack, the assembly comprising:
    a) an electrical motor having a stator, a rotor and a shaft extending along an axis;
    b) a casing for containing the motor;
    c) a body rigid with the shaft for turning movement therewith, for supporting the rotor, the body having an annular chamber concentric with the axis, the chamber extending axially through one end region of the body, and a flange overlying the chamber at said one end region of the body;
    d) a pinion of one-piece with the shaft at one axial end region thereof, for drivingly engaging the rack during movement of the slide;
    e) a transducer stem of one-piece with the shaft at an opposite axial end region thereof; and
    f) bearings mounted on the casing at locations spaced axially apart from each other, for supporting the shaft, the pinion and the stem for joint turning movement.

2. The assembly of claim 1, wherein the motor is a high torque synchronous motor, and wherein the rotor is a multi-polar closed ring.

3. The assembly of claim 1, wherein the casing has end covers on which the bearings are supported.

4. The assembly of claim 1, and a transducer supported by the stem.

5. The assembly of claim 1, wherein the body is keyed to the shaft.

* * * * *